United States Patent
Lee et al.

[11] Patent Number: 6,075,569
[45] Date of Patent: Jun. 13, 2000

[54] METHOD AND APPARATUS FOR SWITCHING AN OPERATION MODE OF AN HDTV SYSTEM

[75] Inventors: Hyeon-kyu Lee, Seoul; Hyun-soo Shin, Kyonggi-do; Ki-bum Kim, Seoul, all of Rep. of Korea

[73] Assignee: Samsung Electronics Co., Ltd., Kyungki-do, Rep. of Korea

[21] Appl. No.: 08/890,617

[22] Filed: Jul. 9, 1997

[30] Foreign Application Priority Data

Jul. 9, 1996 [KR] Rep. of Korea ............ 96-27670

[51] Int. Cl.[7] ............................................. H04N 5/46
[52] U.S. Cl. .................................... 348/554; 348/555
[58] Field of Search ................... 348/554, 555, 348/558, 726, 725; H04N 3/27, 5/46

[56] References Cited

U.S. PATENT DOCUMENTS

5,508,752 4/1996 Kim ........................................ 348/608
5,592,235 1/1997 Park ........................................ 348/555

*Primary Examiner*—Sherrie Hsia
*Attorney, Agent, or Firm*—Sughrue, Mion, Zinn, Macpeak & Seas, PLLC

[57] ABSTRACT

In an HDTV receiver which can be used with both an 8-VSB (Vestigial Side Band) system and a 16-VSB system, since there are so many common modulation parts which are commonly operated between the two systems, an operation mode is automatically switched by using the autocorrelation of the operation modes of the received data without requiring manual operation, and signals for controlling the entire system are thereby realized efficiently and economically in operating the HDTV receiver.

13 Claims, 2 Drawing Sheets

METHOD AND APPARATUS FOR SWITCHING AN OPERATION MODE OF AN HDTV SYSTEM

BACKGROUND OF THE INVENTION

1. Field of the Invention

The present invention relates to an apparatus and a method for switching an operation mode of a high definition television system for receiving both terrestrial broadcasting signals and cable broadcasting signals. More particularly it relates to an apparatus and a method for switching the operation mode of the high definition television (hereinafter referred to as HDTV) system which uses Vestigial Side Band (VSB) modulation.

2. Description of the Related Art

Ever since the Federal Communication Committee (FCC) adopted a broadcasting standard for black and white TV in 1941; color TV, an enhanced definition TV (EDTV) and an HDTV, which has been called the next generation TV, have been sequentially developed. The development of such TV systems are the result of the desire of people who wish to enjoy, through TV, more realistic scenes which look like the real scene.

In contrast to technological developments in electronics, communications, etc., which have changed rapidly, the lifetime of the presently used TV broadcasting standard has been very long, because it is difficult to change the broadcasting standard.

The conventional color TV, which is widely used, operates based on several broadcasting standards: National Television System Committee (NTSC) which is used in Korea, the United States, Japan, etc.; phase alternation by lines (PAL) used in Europe; and sequential color memories (SECAM). However, the standard specifications have been decided based upon the black and white TV technology of 1940, and that technology has been used up until now.

An improved definition TV (IDTV) standard which appeared prior to HDTV, provides a clearer picture to the viewer by enhancing the receiver function of the conventional color TV. The IDTV standard converts the interlaced scanning method of the conventional color TV into a progressive scanning method, and adds display functions and removes "ghosts".

Based upon the conventional color TV broadcasting standard, EDTV enhances presentation performance by enlarging the aspect ratio to 9:16, as in a movie. However, both the IDTV and EDTV standards do not exceed the limits of the conventional TV broadcasting standard. Accordingly, many trials have been held to ensure that a picture results which is clearer than the conventional color TV picture, and the HDTV standard appeared to be in compliance with these trials.

The 'HDTV' standard is defined by International Telecommunication Union-RS (ITU-RS) as follows: a TV which has a vertical/horizontal resolution more than two times that of the conventional TV; solves the problems which occur in conventional TV, such as a cross color; has an aspect ratio of 9:16,wider than the conventional TV; and has an associated digital audio performance which is the same as compact disk (CD) quality. As noted in the ITU-RS definition, HDTV, in short, provides a clearer picture and higher audio quality.

The HDTV systems developed up until now are categorized as two types of systems, according to signal transmission method. The first one is a sampled value transmission system for transmitting a digital signal as an analog signal. It is applicable to a multiple sub-Nyquist sampling encoding (MUSE) system used in Japan and a high definition-multiplex analogue component (HD-MAC) system used in Europe.

The other one is a full-digital system which digitally processes and transmits the signals, and is now actually being used in the United States.

More specifically, the full-digital system increases the number of channels in the conventional broadcasting system (i.e., the number of programs capable of being broadcast) by four to ten times at the 6MHz bandwidth occupied by the conventional broadcasting signals. In the United States, by applying the technology already developed for HDTV broadcasting, cable television (CATV) broadcasting having 540 channels and satellite broadcasting having 150 channels has begun. The application of the full-digital system is not limited to broadcasting, but its applicability extends to the computer and communication fields.

The development of the full-digital system started when the FCC-adopted system for the next generation of TV, namely advanced TV (ATV), was launched at 1987. The ATV system transmits the HDTV signal by means of a 6 MHz signal which is the transmission bandwidth occupied by one terrestrial broadcasting channel. The HDTV signal is compressed into a bandwidth of 6 MHz by using image compression techniques. Since it is impossible to send the HDTV signal at about 1.2 Gbps through a current channel, the signal can be transmitted after the bandwidth of the input signal is compressed in compliance with the bandwidth of the channel. For this purpose, a bit rate reduction by a factor of 50 or higher is required.

The FCC family excluded the analog MUSE system proposed by NHK of Japan in the standardization operation phase in which many research organizations and companies participated. Accordingly, the companies competing with each other finally formed three consortiums and all three consortiums have adopted the full-digital system, and this system has become the standard for the United States.

One of these three consortiums is comprised of Massachusetts Institute of Technology (MIT) and General Instrument (GI), which proposed a channel-compatible digichiper HDTV system. American Telecommunication & Telegram (AT&T) and Zenith comprise another consortium which proposed a digital spectrum compatible HDTV system. The third consortium which is the Advanced Television Research Consortium (ATRC) organized by Philips, Tomson, David Sarnoff, NBC and CLI, proposed an ADTV system. In order to ensure the most proper characteristic and compatibility between the competitive systems, the Grand Alliance (GA) was is established.

The Grand Alliance HDTV (GA HDTV) system has tried to strike a balance in order to satisfy the requirements for simultaneous broadcasting of HDTV, which is the capability of maintaining compatibility with the conventional color TV standard, i.e., the NTSC standard.

The GA HDTV system adopts the data compression method based upon both Motion Picture Experts Group-2 (MPEG-2) and 8-VSB (Vestigial Side Band) for the channel coding method for terrestrial broadcasting. Moreover, it is convincing that 16-VSB channel coding method can be adopted for use in cable broadcasting.

SUMMARY OF THE INVENTION

It is therefore an object of the invention to provide a technique for switching an operation mode of an HDTV system capable of automatically switching an operation mode by using the autocorrelation for the operation mode of received data without any manual operation at a receiver, and outputting a signal for controlling the entire system, in developing the receiver which is commonly used for a 8-VSB system and a 16-VSB system based upon the fact that there are so many common modulation parts which are commonly used between the two systems.

To accomplish the above-mentioned objects, a method and apparatus for switching the operation mode of the HDTV according to the present invention are directed to detecting mode data from received data by a field data detection unit and a mode data detection unit; calculating each autocorrelation for 8-VSB and 16-VSB by an autocorrelation unit; selecting an operation mode having high autocorrelation by comparing the modes through a comparing unit; and providing a control signal corresponding to each operation mode to the apparatus operated when switching the system.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Figure 1:
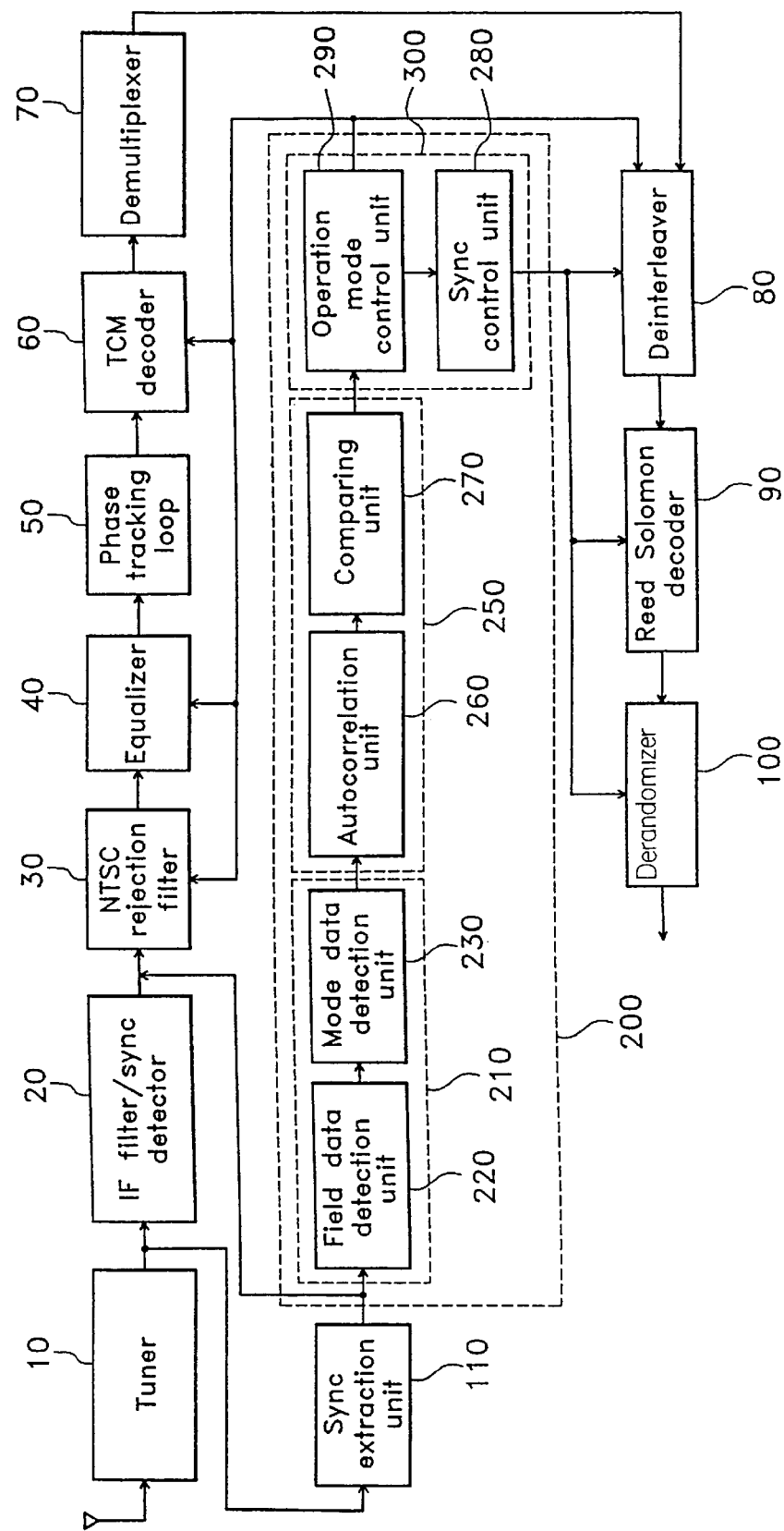
FIG. 1 is a block diagram showing an apparatus for switching an operation mode of an HDTV system according to the present invention.

The preferred embodiments hereinafter will be described in more specific detail by referring to the drawings.

Referring to FIG. 1, an apparatus for switching an operation mode of the HDTV system according to the present invention is explained.

The apparatus for switching the operation mode of an HDTV system includes a tuner 10 which tunes a transmitted HDTV signal; an intermediate frequency (IF) filter/sync detector 20 which detects an intermediate frequency and a sync signal from the signal tuned by the tuner 10; an NTSC rejection filter 30 which removes an NTSC signal carrier from the output of the IF filter/sync detector 20 when operating an 8-VSB mode signal; an equalizer 40 which removes intersymbol interference (ISI) of the signal output from the NTSC rejection filter 30; a phase tracking loop 50 which is connected to the equalizer 40 and recovers the phase by tracking the deviated phase; a Trellis Coded Modulation (TCM) decoder 60 which corrects random errors when operating on an 8-VSB mode signal; a demultiplexer 70 which demultiplexes a video signal, a text signal and an audio signal contained in the output of the TCM decoder 60; a data deinterleaver 80 which is connected to the demultiplexer 70 and deinterleaves interleaved signals for random errors by scattering burst errors; a Reed-Solomon decoder 90 which is connected to the data deinterleaver 80 and corrects the burst errors; a derandomizer 100 which is connected to the Reed-Solomon decoder 90 and derandomizes randomized signals in the signal output from the Reed-Solomon decoder 90 to remove the burstiness of the signal.

The apparatus also includes a sync extraction unit 110 which is attached to one side of the IF filter/sync detector 20 and extracts the sync signal; and a mode switching unit 200 which is connected in common with the sync extraction unit 110 and the IF filter/sync detector 20. The mode switching unit 200 provides a control signal to the apparatus which is being operated when switching the system by selecting an operation mode based upon the autocorrelation of the input operation mode.

The mode switching unit 200 includes a data detection unit 210 for detecting operation mode data from the input signal; a mode selection unit 250 for calculating the autocorrelation of the detected operation mode data, and selecting one mode by comparing the autocorrelation of the modes; and a control unit 300 for supplying a control signal and a sync control signal to the apparatus being operated when switching the system, according to the output of the mode selection unit 250.

The data detection unit 210 includes a field data detection unit 220 for detecting field data from the input signal; and a mode data detection unit 230 for detecting operation mode data from the field data. The mode selection unit 250 includes an autocorrelation unit 260 for calculating the autocorrelation regarding each operation mode by using the operation mode data; and a comparing unit 270 for comparing each calculated autocorrelation and selecting an operation mode having the largest autocorrelation. Moreover, the control unit 300 includes an operation mode control unit 290 for supplying proper mode controls signal to the NTSC rejection filter 30, the equalizer 40, the TCM decoder 60 and the data deinterleaver 80; and a sync control unit 280 for supplying proper sync control signals to the data deinterleaver 80, the Reed-Solomon decoder 90 and the derandomizer 100.

The operation of the apparatus for switching the operation mode of the HDTV system having the above-described structure will be explained, below with reference to FIG. 1.

To facilitate understanding of the invention, digital data modulation methods of a TV signal will be briefly explained, centering around the vestigial side band (VSB) communication method.

Improvement in transmission speed is an important goal for the digital data modulation method of a TV signal. Here, two preferred methods are described.

The first method is a multilevel modulation of the carrier signal, which, until now, has been used in microwave communications. However, the multilevel modulation method has been exploited for use in broadcasting, and practically will be used for both terrestrial broadcasting and cable broadcasting.

The other method is to efficiently modulate data, encoded highly efficiently, on a plurality of carriers. A European digital TV development consortium makes every possible effort to develop this method. This modulation method is called orthogonal frequency division modulation (OFDM), because it increases the transmission speed by efficiently using the available frequency bandwidth, and is convenient to interfere the ghost and diversity.

As discussed above, since the GA HDTV (Grand Alliance HDTV) has adopted 8-VSB supplied by Zenith as a modulation method for terrestrial broadcasting, the interest in the multilevel modulation method based upon VSB is rapidly increasing.

The multilevel VSB communication uses a digital amplitude modulation method, namely, amplitude shift keying (ASK). Generally, this method is explained by comparison with the multilevel quadrature amplitude modulation (QAM). Accordingly, 8-VSB and 64-QAM, having similar efficiency characteristics, are comparatively explained.

Though the number of constellation points of 64-QAM is the square of that of 8-VSB, since 8-VSB uses the VSB having a bandwidth similar to a single side-band (SSB) as a system filter, while 64-QAM uses a double side band (DSB), the ultimate transmission efficiency and the required carrier to noise ratio (CNR) are similar, thereby proving its superiority.

The multilevel modulation method makes it possible to recover the carrier signal which is simple and stable, since a pilot signal is transmitted. Since VSB modulation adopts the digital amplitude method, when the VSB filter is realized, it provides the benefit of having a simple structure.

First, the tuner 10 tunes the transmitted HDTV signal, and the IF filter/sync detector 20 converts the tuned RF (radio frequency) into a predetermined IF (intermediate frequency) and detects the HDTV signal and the sync signal. The NTSC rejection filter 30 is a required unit for broadcasting both the HDTV signal and the conventional NTSC TV signal, and it separates the NTSC carrier signal from the input signal. Since that filter is not necessary for cable broadcasting, for the case in which the input signal is determined to be the cable broadcasting signal, the mode switching unit 200, according to the present invention, bypasses the input signal by applying an NRF OFF signal to the NTSC rejection filter 30.

The equalizer 40 removes ISI (intersymbol interference) of the signal which is passed by the NTSC rejection filter 30. Especially since the intersymbol interference is one of the main factors in increasing the error probability in the multilevel modulation method, it is essential to design a proper equalizer capable of exactly complying with the goal of transmitting correct information by protecting information from errors generated in the transmission channel and detecting and correcting the errors.

Generally, the equalizer delays the signal through a plurality of taps to remove the intersymbol interference by employing a prediction technique. Accordingly, as the numbers of taps used in 8-VSB and 16-VSB modes are properly adjusted in compliance with each operation mode, in the case where the input signal is determined to be a cable broadcasting signal, namely, a 16-VSB mode signal, the mode switching unit 200 provides a control signal to control the number of taps used in the equalizer to be suitable for a 16-VSB mode signal.

The phase tracking loop 50 tracks the deviated phase by using a closed loop and precisely adjusts the internal sync. The TCM decoder 60 corrects random errors when operating according to 8-VSB, based upon the Viterbi algorithm. Since the cable broadcasting method using 16-VSB modulation, does not adopt the TCM encoding method due to a high ratio of carrier-to-noise, a TCM OFF signal is received from the mode switching unit 200 and the input signal is bypassed.

The demultiplexer 70 separates the input HDTV signal into the corresponding video, text and audio signals, and the data deinterleaver 80 deinterleaves interleaved signals for random errors by scattering the burst errors. After that, the Reed-Solomon decoder 90 corrects the burst errors. The Reed-Solomon encoding, suggested by I. S. Reed and G. Solomon, is used to correct both burst errors and random errors. It extended the binary BCH code suggested by Bose, Chaudhuri, and Hocquenghen to a non-binary BCH code. Here, the BCH encoding extends the single correction code, namely, a Hamming code, to a multiple error correction code capable of correcting a plurality of random errors.

The derandomizer 100 derandomizes the randomized signals to remove the burstiness of the signal.

The sync extraction unit 110 is attached to one side of the IF filter/sync detector 20, and extracts the sync signal. The mode switching unit 200 is connected to a common contact of the sync extraction unit 110 and the IF filter/sync detector 20 and thereby receives as an input signal the sync signal output from the sync extraction unit 10. The mode switching unit selects an operation mode according to the autocorrelation of the operation mode, thereby supplying a control signal to the apparatus operated when switching the mode in which the system operates.

The field data detection unit 220 detects field data from the input signal, and the mode data detection operation unit 230 detects the operation mode data from the field data and applies the detected mode data to the autocorrelation unit 260. The autocorrelation unit 260 calculates the autocorrelation regarding each operation mode by using the operation mode data, and the comparing unit 270 compares each autocorrelation and selects an operation mode having a largest autocorrelation.

Figure 2A:
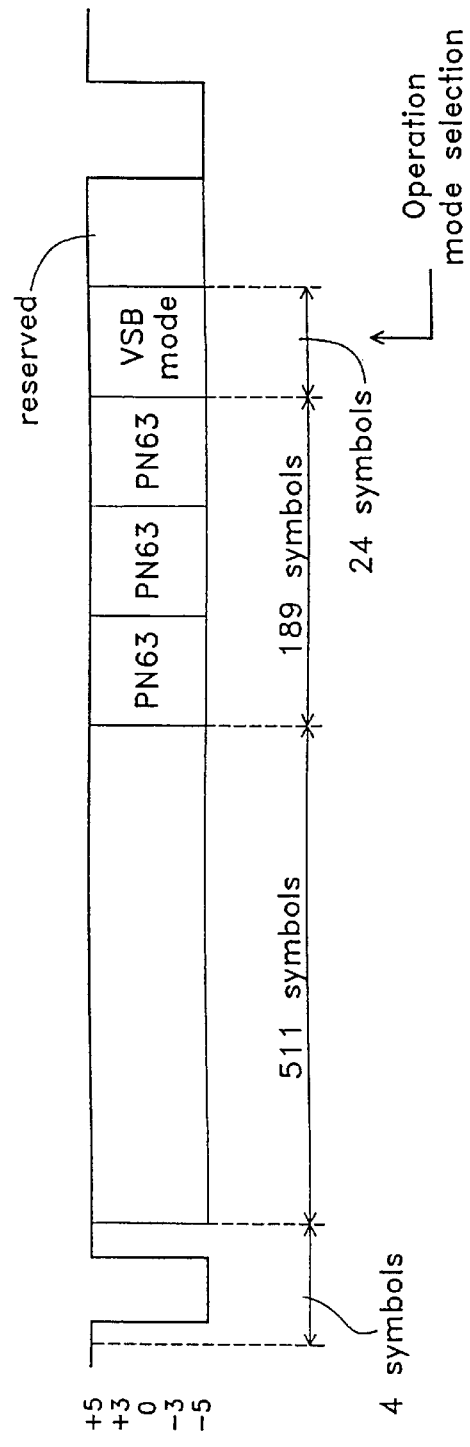
FIGS. 2A and 2B are diagrams illustrating the data characteristic of one (1) field-sync interval of transmitted data.
Figure 2B:
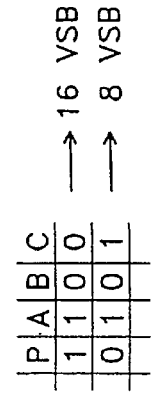

FIG. 2A shows a data characteristic of one (1) field-sync interval of the transmitted data in which the mode selection characteristics of 8-VSB and 16-VSB are shown for the "VSB mode". FIG. 2B shows specific values of the VSB mode of the data characteristic shown in FIG. 2A, for the 8-VSB and 16-VSB operation modes. Here, the so-called "autocorrelation" indicates a product of an original signal and a signal which is delayed in the time domain. That is, it indicates accordance between a time-shifted code and the original code. Accordingly, the autocorrelation $R_a$ is defined by the expression $$R_a = \int f(t)f(t-\tau)dt$$

where $\tau$ is a delayed time. As shown in the equation, the autocorrelation $R_a$ has its largest value when the two signals have the same value.

The autocorrelation unit 260, as shown in FIG. 1, calculates the autocorrelation between the signal received from the mode data detection unit 230 and a 24-bit VSB mode signal for 8-VSB shown in FIG. 2B, and between that same signal and a 24-bit VSB mode signal for 16-VSB shown in FIG. 2B. The comparing unit 270, which receives an output from the autocorrelation unit 260, compares the autocorrelation for each 8-VSB and 16-VSB operation mode, and then supplies the comparison results to the operation mode control unit 290.

As a result of the comparison by the comparing unit 270, in the case of the autocorrelation for the 16-VSB operation mode, the operation mode control unit 290 supplies an NRF OFF signal to the NTSC rejection filter 30, enabling the NTSC rejection filter 30 to bypass the input signal, and provides a signal to properly adjust the number of taps used in the equalizer 40 to be suitable for operating according to the 16-VSB method. Moreover, the operation mode control unit 290 supplies a TCM OFF signal to the TCM decoder 60, enabling the TCM decoder to bypass the input signal, and provides a control signal to convert the depth of the data deinterleaver 80 suitable for 8-VSB into a depth suitable for 16-VSB operation.

The sync control unit 280 supplies to the data deinterleaver 80, the Reed-Solomon decoder 90 and the derandomizer 100 a sync control signal suitable for 16-VSB operation.

The HDTV operation mode switching method according to the present invention is explained as follows.

The inventive HDTV operation mode switching method includes detecting operation mode data from the input signal; selecting a mode by calculating the autocorrelation of each operation mode indicated by the operation mode data; selecting an operation mode having a largest autocorrelation; and supplying a control signal and a sync control signal to the HDTV system based on the selection.

The process for detecting data includes detecting field data from the input data signal; and detecting the operation mode data from the field data. The process for selecting a mode includes calculating the autocorrelation for each operation mode indicated in the operation mode data, comparing each autocorrelation and selecting an operation mode having a largest autocorrelation. Additionally, the process of supplying a control signal includes controlling the operation mode by supplying control signals to the NTSC rejection filter 30, the equalizer 40, the TCM decoder 60 and the data deinterleaver 80, and controlling synchronization by supplying sync control signals to the data deinterleaver 80, the Reed-Solomon decoder 90, and the derandomizer 100.

The procedure for switching the operation mode of the HDTV system having the above-described structure is explained in detail as follows.

First, the operation mode data is detected from the input data in the process for detecting data. The autocorrelation of the detected operation mode data is calculated and an operation mode is selected by comparing the autocorrelations of the operation modes. In the process for supplying a control signal, the control signal and sync control signal are supplied to the HDTV system according to the selected operation mode.

As described above, the technique for switching an operation mode of a HDTV system according to the present invention includes detecting mode data from data received by the field data detection unit 220 and the mode data detection unit 230, and calculating autocorrelations for each of 8-VSB/16-VSB using the autocorrelation unit 260. After that, the operation mode having a high autocorrelation is selected by the comparing unit, and control signals corresponding to each operation mode are supplied to the apparatus operated when switching the system. Accordingly, when a receiver is used for both terrestrial broadcasting and cable broadcasting, the efficiency and economy in operating an HDTV receiver can be enhanced, since the operation mode is automatically selected according to the transmitted signal without requiring manual mode switching.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for switching an operation mode of an HDTV system operating a plurality of multilevel modulation/demodulation systems, comprising:

a mode switching unit for receiving a modulated input signal; selecting one operation mode from a plurality of operation modes based upon an autocorrelation of the operation modes for the multilevel modulation demodulation systems; and supplying a control signal and a sync control signal corresponding to the selected operation mode to the apparatus operated when switching the system between the plurality of multilevel modulation/demodulation systems.

2. The apparatus of claim 1, wherein said mode switching unit comprises:

a data detection unit for detecting operation mode data from said input signal;

a mode selection unit for calculating the autocorrelation based on said detected operation mode data, and selecting one mode by comparing the autocorrelation of the modes; and a control unit for supplying the control signal and the sync control signal to the apparatus which is operated when switching the operation mode of the HDTV system, according to an output of the mode selection unit.

3. The apparatus of claim 2, wherein said input signal contains field data and the field data contains the operation mode data, and wherein said data detection unit comprises:

a field data detection unit for detecting the field data from said input signal; and a mode data detection unit for detecting the operation mode data from said field data.

4. The apparatus of claim 2, wherein said mode selection unit comprises:

an autocorrelation unit for calculating the autocorrelation regarding each operation mode by using the operation mode data; and a comparing unit for comparing each calculated autocorrelation and selecting an operation mode having a largest autocorrelation.

5. The apparatus of claim 2, wherein said control unit comprises:

an operation mode control unit for supplying the control signal to an NTSC rejection filter for detecting a carrier of an NTSC signal which is a component of the HDTV system; an equalizer for removing an intersymbol interference of a signal output from the NTSC rejection filter; a Trellis Coded Modulation (TCM) decoder for correcting random errors; and a data deinterleaver for deinterleaving interleaved signal; and a sync control unit for supplying the sync control signal to said data deinterleaver; a Reed-Solomon decoder connected to said data deinterleaver and correcting burst errors from the deinterleaved signals and outputting decoded signals; and a derandomizer connected to said Reed-Solomon decoder and derandomizing the decoded signals to remove burstiness from the decoded signals.

6. The apparatus of claim 1, wherein said multilevel modulation demodulation systems include a 8-VSB (Vestigial Side Band) system and a 16-VSB system.

7. Amended) A method for switching an operation mode of an HDTV system operating a plurality of multilevel modulation/demodulation systems, comprising:

receiving a modulated input signal;

selecting one operation mode out of a plurality of operation modes based upon an autocorrelation of the operation modes for the multilevel modulation/demodulation systems; and supplying a control signal and a sync control signal corresponding to the selected operation mode to the HDTV system operated when switching the operation mode of the HDTV system.

8. The method of claim 7, wherein said selecting one operation mode comprises:

detecting operation mode data from said input signal; and selecting a mode by calculating the autocorrelation of each operation mode for said operation mode data and selecting an operation mode having a largest autocorrelation; and wherein said supplying a control signal and a sync control signal comprises supplying a control signal and a sync control signal to said HDTV system operated when switching the HDTV system according to the selected operation mode.

9. The method of claim 8, wherein said detecting operation mode data comprises:

detecting field data from said input signal; and detecting said operation mode data from said field data.

10. The method of claim 8, wherein said selecting a mode comprises:

calculating the autocorrelation for each operation mode by using the operation mode data; and comparing each autocorrelation and selecting an operation mode having a largest autocorrelation.

11. The method of claim 8, wherein said supplying a control signal and a sync control signal comprises:

controlling the operation mode by supplying the control signal to: an NTSC rejection filter for detecting a carrier of an NTSC signal; an equalizer for removing an intersymbol interference (ISI of the NTSC signal output from said NTSC rejection filter; a Trellis Coded modulation (TCM) decoder for correcting random errors in a signal output from the equalizer; and a data deinterleaver for deinterleaving interleaved signals from a signal output from the TCM decoder; and controlling synchronization by supplying the sync control signal to said data deinterleaver; a Reed-Solomon decoder, connected to said data deinterleaver. for correcting burst errors in an output of the data deinterleaver; and a derandomizer, connected to said Reed-Solomon decoder, for derandomizing a signal output from the Reed-Solomon decoder to remove burstiness therein.

12. The method of claim 8, wherein said multilevel modulation/demodulation systems include an 8-VSB (Vestigial Side Band) system and a 16-VSB system.

13. An apparatus for switching an operation mode of an HDTV system, comprising. a tuner which tunes a transmitted HDTV signal;

an intermediate frequency (IF) filter/sync detector which detects an intermediate frequency and a sync signal from the signal tuned by said tuner;

an NTSC rejection filter which removes a carrier of an NTSC signal from an output of said IF filter/sync detector; an equalizer which removes an ISI (intersymbol interference) of a signal output from said NTSC rejection filter;

a phase tracking loop connected to said equalizer and recovering a phase state by tracking a deviated phase;

a Trellis Coded Modulation (TCM) decoder which corrects random errors in a signal output from said phase tracking loop;

a demultiplexer which demultiplexes an output signal of said TCM decoder;

a data deinterleaver connected to said demultiplexer and deinterleaving interleaved signals in a signal output from said demultiplexer;

a Reed-Solomon decoder connected to said data deinterleaver and correcting burst errors in a signal output from said data deinterleaver;

a derandomizer connected to said Reed-Solomon decoder and deramdomizing a randomized signal output from said Reed-Solomon decoder to remove the burstiness of the signal;

a sync extraction unit attached to one side of said IF filter/sync detector and extracting the sync signal from the tuned HDTV signal; and a mode switching unit which receives an output of said sync extractions unit, selects one operation mode based upon an autocorrelation of operation modes for multilevel VSB (Vestigial Side Band) systems, and supplies a control signal and a sync control signal corresponding to the selected operation mode to the apparatus which is operated when switching the HDTV system.

* * * * *